(12) United States Patent
Shintani et al.

(10) Patent No.: US 11,784,320 B2
(45) Date of Patent: Oct. 10, 2023

(54) CATALYST, CATALYST LAYER, MEMBRANE-ELECTRODE ASSEMBLY, ELECTROCHEMICAL DEVICE, AND METHOD FOR PRODUCING CATALYST

(71) Applicant: Panasonic Intellectual Property Management Co., Ltd., Osaka (JP)

(72) Inventors: Haruhiko Shintani, Osaka (JP); Nobuhiro Miyata, Osaka (JP); Tomokatsu Wada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 17/232,385

(22) Filed: Apr. 16, 2021

(65) Prior Publication Data
US 2021/0242471 A1 Aug. 5, 2021

Related U.S. Application Data

(63) Continuation of application No. PCT/JP2020/033683, filed on Sep. 4, 2020.

(30) Foreign Application Priority Data

Sep. 27, 2019 (JP) .................................. 2019-176699
Jul. 31, 2020 (JP) .................................. 2020-130236

(51) Int. Cl.
*H01M 4/92* (2006.01)
*B01J 21/18* (2006.01)
(Continued)

(52) U.S. Cl.
CPC ........... *H01M 4/926* (2013.01); *B01J 21/185* (2013.01); *B01J 23/42* (2013.01); *B01J 23/75* (2013.01);
(Continued)

(58) Field of Classification Search
CPC . B01J 21/185; B01J 23/42; B01J 23/75; B01J 35/023; B01J 35/1047;
(Continued)

(56) References Cited

U.S. PATENT DOCUMENTS 7,994,088 B2 * 8/2011 Pak ....................... H01M 4/885
429/525
11,367,879 B2 * 6/2022 Shintani .............. H01M 4/8657
(Continued)

FOREIGN PATENT DOCUMENTS

EP 3349281 A1 * 7/2018
EP 2990109 B1 * 10/2019
(Continued)

OTHER PUBLICATIONS

Written Opinion for PCT/JP2020/033683. (Year: 2020).*
(Continued)

*Primary Examiner* — Patricia L. Hailey
(74) *Attorney, Agent, or Firm* — McDermott Will & Emery LLP

(57) ABSTRACT

A catalyst includes a mesoporous material and catalytic metal particles supported at least within the mesoporous material and containing platinum and a metal different from platinum. The mesoporous material has mesopores with a mode radius of 1 to 25 nm and a pore volume of 1.0 to 3.0 cm³/g before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25, and among the catalytic metal particles, a volume ratio of catalytic metal particles having a particle size of greater than or equal to 20 nm is less than or equal to 10%.

20 Claims, 2 Drawing Sheets

(51) Int. Cl.
  *B01J 23/42* (2006.01)
  *B01J 23/75* (2006.01)
  *B01J 35/02* (2006.01)
  *B01J 35/10* (2006.01)
  *B01J 37/02* (2006.01)
  *B01J 37/08* (2006.01)
  *B01J 37/16* (2006.01)
  *H01M 8/1004* (2016.01)
  *H01M 8/1067* (2016.01)

(52) U.S. Cl.
  CPC ......... *B01J 35/023* (2013.01); *B01J 35/1047* (2013.01); *B01J 35/1061* (2013.01); *B01J 37/0207* (2013.01); *B01J 37/08* (2013.01); *B01J 37/16* (2013.01); *H01M 4/921* (2013.01); *H01M 8/1004* (2013.01); *H01M 8/1067* (2013.01)

(58) Field of Classification Search
  CPC .... B01J 35/1061; B01J 37/0207; B01J 37/08; B01J 37/16; H01M 4/921; H01M 8/1004; H01M 8/1067
  USPC .................................. 429/524; 502/185, 326
  See application file for complete search history.

(56) References Cited

U.S. PATENT DOCUMENTS

2009/0136808 A1* 5/2009 Kang .................... H01M 4/921
                                                              423/445 B
2011/0207014 A1* 8/2011 Mitsuta ............... H01M 8/1004
                                                              429/480
2011/0318254 A1   12/2011 Morishita
2016/0064744 A1    3/2016 Mashio et al.
2016/0079605 A1    3/2016 Mashio et al.
2016/0093892 A1    3/2016 Hori et al.
2018/0166697 A1*  6/2018 Yamamoto ............. C01B 32/20
2018/0301726 A1   10/2018 Shintani et al.
2019/0319276 A1* 10/2019 Oto ........................ C01B 32/30

FOREIGN PATENT DOCUMENTS

| JP | 2003142112 A * | 5/2003 |
| JP | 2010-208887 | 9/2010 |
| JP | 2018098196 A * | 6/2018 |
| JP | 2018-181838 | 11/2018 |
| JP | 6566331 B2 | 8/2019 |
| JP | 2019186205 A * | 10/2019 |
| WO | 2014/175106 | 10/2014 |
| WO | 2014/185498 | 11/2014 |
| WO | WO-2016152447 A1 * | 9/2016 |

OTHER PUBLICATIONS

International Search Report of PCT application No. PCT/JP2020/033683 dated Oct. 20, 2020.

The EPC Office Action dated Jul. 3, 2023 for the related European Patent Application No. 20868053.8.

* cited by examiner

CATALYST, CATALYST LAYER, MEMBRANE-ELECTRODE ASSEMBLY, ELECTROCHEMICAL DEVICE, AND METHOD FOR PRODUCING CATALYST

BACKGROUND

1. Technical Field

The present disclosure relates to a catalyst, a catalyst layer including the catalyst, a membrane-electrode assembly including the catalyst layer, an electrochemical device including the membrane-electrode assembly, and a method for producing a catalyst.

2. Description of the Related Art

Fuel cells are known as examples of electrochemical devices. For example, solid polymer fuel cells include a membrane-electrode assembly having a function of causing an electrochemical reaction (power generation reaction) between a fuel gas containing hydrogen and an oxidizing agent gas containing oxygen. The membrane-electrode assembly includes a polymer electrolyte membrane, a pair of catalyst layers formed on both surfaces of this polymer electrolyte membrane, and gas diffusion layers disposed so as to sandwich the catalyst layers.

In general, such a catalyst layer is formed by preparing a catalyst paste, applying the catalyst paste to a polymer electrolyte membrane or another substrate, and drying the catalyst paste. The catalyst paste is prepared by dispersing a catalyst and a polymer electrolyte (hereinafter, referred to as an ionomer) having proton conductivity in a solvent such as water or an alcohol. The catalyst includes a catalytic metal, such as platinum, and an electrically conductive material, such as carbon black, on which the catalytic metal is supported. In a microstructure (hereinafter, referred to as a three-phase interface structure) of the catalyst layer prepared as described above, the catalyst is covered with the ionomer. Regarding the three-phase interface structure, it has been believed that bringing a catalytic metal into contact with an ionomer leads to an improvement in the performance from the viewpoint of supplying the catalytic metal surface with protons. In recent years, however, it has been found that bringing a catalytic metal and an ionomer into contact with each other rather decreases the performance of the catalyst because the ionomer poisons the catalytic metal.

To address such an issue relating to the decrease in the performance of a catalyst, International Publication No. 2014/185498 and Japanese Unexamined Patent Application Publication No. 2018-181838 (hereinafter referred to as Patent Literature 1 and Patent Literature 2, respectively) propose methods for avoiding contact with an ionomer by placing a metal catalyst within a carbon support having large-volume pores inside thereof, such as mesoporous carbon. Furthermore, Japanese Patent No. 5998277 (hereinafter referred to as Patent Literature 3) proposes a method in which catalytic activity is enhanced by using an alloy as a catalytic metal placed within mesoporous carbon. For example, Patent Literature 3 discloses a catalyst for a fuel cell, the catalyst including alloy particles that contain platinum and a metal component other than platinum in a blending ratio of 4:1 to 1:1 (molar ratio), in which at least some of the alloy particles are supported in mesopores. In this case, alloy particles having a desired composition can be obtained by controlling the mesopores of the support so as to have a radius of 1 to 10 nm and a mode radius of 2.5 to 10 nm.

SUMMARY

In the related art (Patent Literatures 1 to 3), no sufficient studies have been conducted on catalysts having high catalytic activities.

One non-limiting and exemplary embodiment provides a catalyst having high catalytic activity.

In one general aspect, the techniques disclosed here feature a catalyst including a mesoporous material, and catalytic metal particles supported at least within the mesoporous material and containing platinum and a metal different from platinum. The mesoporous material has mesopores with a mode radius of greater than or equal to 1 nm and less than or equal to 25 nm and a pore volume of greater than or equal to $1.0\ cm^3/g$ and less than or equal to $3.0\ cm^3/g$ before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25, and among the catalytic metal particles, a volume ratio of catalytic metal particles having a particle size of greater than or equal to 20 nm is less than or equal to 10%.

The present disclosure is configured as described above and provides an advantage in that high catalytic activity is obtained.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
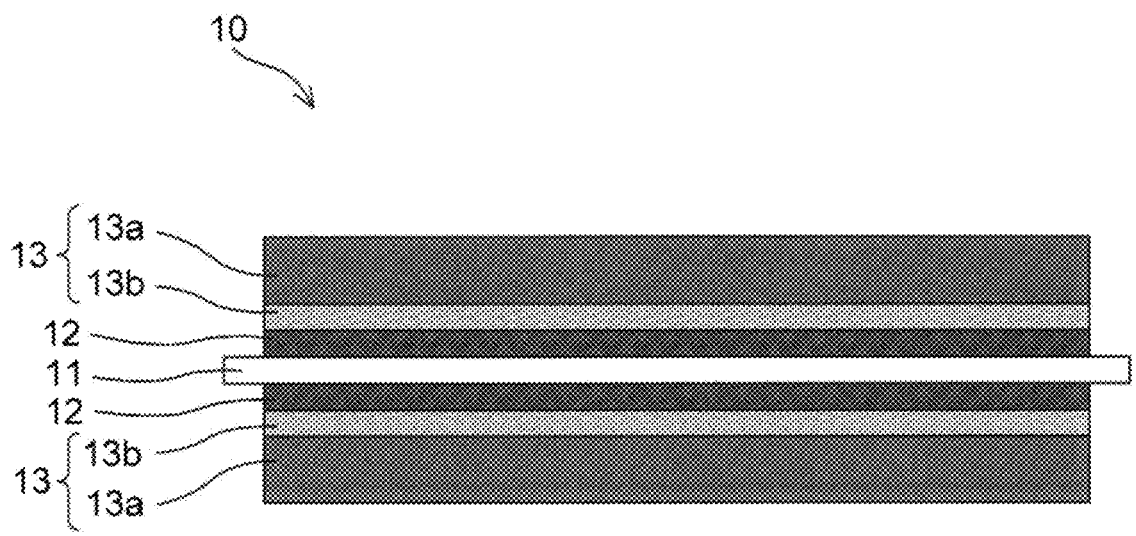
FIG. 1 is a schematic view illustrating an example of a schematic structure of a membrane-electrode assembly included in an electrochemical device according to an embodiment of the present disclosure.

Underlying Knowledge Forming Basis of One Embodiment of the Present Disclosure

To date, it is believed that since an ionomer in a catalyst ink has a size of several tens of nanometers and hardly enters mesopores with a radius of greater than or equal to 1 nm and less than or equal to 10 nm, Pt which is a catalytic metal placed within mesoporous carbon as in the related art (Patent Literatures 1 to 3) is not affected by poisoning by the ionomer.

However, in reality, an ionomer can partly enter mesopores depending on the ionomer size distribution and the mesopore size distribution. In addition, since an ionomer tends to adsorb to Pt, an ionomer that enters mesopores adsorbs to Pt near the surface of mesoporous carbon and reduces catalytic activity.

Thus, it is considered that, even in the inside of mesoporous carbon, Pt near the surface of the mesoporous carbon is affected by poisoning by the ionomer. Specifically, mesoporous carbon having a small particle size has a larger proportion of Pt present near the surface thereof than mesoporous carbon having a larger particle size. It is considered that, consequently, the effect of poisoning by the ionomer increases, resulting in the reduction in catalytic activity. In view of this, the inventors of the present invention have found that, to obtain high catalytic activity, mesoporous carbon suitably has an average particle size of greater than or equal to 200 nm.

The inventors of the present invention found that when platinum-cobalt alloy particles having a cobalt molar ratio (Co/(Pt+Co)) of greater than or equal to 0.25 are supported on mesoporous carbon having an average particle size of greater than or equal to 200 nm by the method described in Patent Literature 3, catalytic metal particles having a high content of a cobalt component and having a particle size of greater than or equal to 20 nm due to aggregation are formed near the surface of the mesoporous carbon in a large amount. It was also found that since such catalytic metal particles having a particle size of greater than or equal to 20 nm due to aggregation are formed near the surface of the mesoporous carbon in a large amount, the catalyst cannot have high catalytic activity.

These findings of the inventors of the present invention have not been disclosed and have novel technical features that achieve significant operational advantages. The present disclosure specifically provides the following aspects.

A catalyst according to a first aspect of the present disclosure includes a mesoporous material, and catalytic metal particles supported at least within the mesoporous material and containing platinum and a metal different from platinum. The mesoporous material has mesopores with a mode radius of greater than or equal to 1 nm and less than or equal to 25 nm and a pore volume of greater than or equal to 1.0 cm$^3$/g and less than or equal to 3.0 cm$^3$/g before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25, and among the catalytic metal particles, a volume ratio of catalytic metal particles having a particle size of greater than or equal to 20 nm is less than or equal to 10%.

According to the above configuration, since the molar ratio of the metal different from platinum and contained in the catalytic metal particles relative to all metals contained in the catalytic metal particles is greater than or equal to 0.25, the catalytic metal particles can have sufficiently enhanced catalytic activity. Furthermore, in the catalytic metal particles, since the volume ratio of the catalytic metal particles having a particle size of greater than or equal to 20 nm is less than or equal to 10%, a decrease in the catalytic activity due to a decrease in the reaction surface area can be suppressed.

Furthermore, in the catalyst, the catalytic metal particles are placed within the mesoporous material having an average particle size of greater than or equal to 200 nm. Therefore, even when a catalyst layer is formed by using an ionomer, contact between a catalytic metal particle and the ionomr can be suppressed.

Accordingly, the catalyst according to the first aspect of the present disclosure advantageously has high catalytic activity. In addition, when, for example, a fuel cell is produced by using this catalyst, the fuel cell can achieve high power generation performance.

According to a catalyst according to a second aspect of the present disclosure, in the first aspect, a molar ratio of the metal different from platinum and contained in the catalytic metal particles having a particle size of greater than or equal to 20 nm relative to all metals contained in the catalytic metal particles having a particle size of greater than or equal to 20 nm is larger than a molar ratio of the metal different from platinum and contained in catalytic metal particles having a particle size of less than 20 nm relative to all metals contained in the catalytic metal particles having a particle size of less than 20 nm.

According to a catalyst according to a third aspect of the present disclosure, in the first or second aspect, the metal different from platinum may be cobalt.

According to the above configuration, the catalytic metal particles can be made of an alloy containing platinum and cobalt, the alloy having good catalytic activity and high durability.

According to a catalyst according to a fourth aspect of the present disclosure, in any one of the first to third aspects, the mode radius of the mesopores may be greater than or equal to 3 nm and less than or equal to 6 nm.

According to the above configuration, since the mode radius of the mesoporous is greater than or equal to 3 nm and less than or equal to 6 nm, a reaction gas can be efficiently supplied to the catalytic metal particles within the mesoporous material while entering of the ionomer into the interior of the mesoporous material is suppressed.

According to a catalyst according to a fifth aspect of the present disclosure, in any one of the first to fourth aspects, the mesoporous material may be mesoporous carbon.

According to the above configuration, since the mesoporous material is mesoporous carbon, the catalyst can have good electrical conductivity and water repellency. In addition, when, for example, a fuel cell is produced by using this catalyst, the fuel cell can achieve high power generation performance.

A catalyst layer according to a sixth aspect of the present disclosure includes an ionomer and a catalyst that includes a mesoporous material and catalytic metal particles supported at least within the mesoporous material and containing platinum and a metal different from platinum. In the catalyst, the mesoporous material has mesopores with a mode radius of greater than or equal to 1 nm and less than or equal to 25 nm and a pore volume of greater than or equal to 1.0 cm$^3$/g and less than or equal to 3.0 cm$^3$/g before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25. In addition, among the catalytic metal particles, a volume ratio of catalytic metal particles having a particle size of greater than or equal to 20 nm is less than or equal to 10%.

According to the above configuration, the catalyst layer can utilize high proton conductivity of the ionomer. Furthermore, the catalyst layer can suppress a decrease in activity due to contact between a catalytic metal particle and the ionomer. Accordingly, the catalyst layer according to the sixth aspect of the present disclosure advantageously has high catalytic activity. In addition, when, for example, a fuel cell is produced by using this catalyst layer, the fuel cell can achieve high power generation performance.

According to a catalyst layer according to a seventh aspect of the present disclosure, in the sixth aspect, the catalyst layer may include at least one of carbon black or carbon nanotube.

Here, carbon particles constituting carbon black and carbon nanotube have an average particle size in a range of greater than or equal to 10 nm and less than or equal to 100 nm and are fine. Therefore, the catalyst layer including such carbon particles can achieve a high drainage performance due to capillary force. On the other hand, the mesoporous material has an average particle size of greater than or equal to 200 nm. Thus, in the catalyst layer composed only of the mesoporous material, a problem of drainage performance may occur.

According to the above configuration, since the catalyst layer includes at least one of carbon black or carbon nanotube, the drainage performance can be enhanced compared with the catalyst layer composed only of the mesoporous material. In addition, when, for example, a fuel cell is produced by using this catalyst layer, the fuel cell can achieve high power generation performance.

According to a catalyst layer according to an eighth aspect of the present disclosure, in the seventh aspect, the carbon black may be Ketjenblack.

According to the above configuration, since the carbon black included in the catalyst layer is Ketjenblack, the catalyst layer can have good electrical conductivity and drainage performance. In addition, when, for example, a fuel cell is produced by using this catalyst layer, the fuel cell can achieve high power generation performance.

A membrane-electrode assembly according to a ninth aspect of the present disclosure includes a polymer electrolyte membrane, a fuel electrode disposed on a first main surface of the polymer electrolyte membrane, and an air electrode disposed on a second main surface of the polymer electrolyte membrane. The air electrode includes a catalyst layer that includes an ionomer and a catalyst including a mesoporous material and catalytic metal particles supported at least within the mesoporous material and containing platinum and a metal different from platinum. In the catalyst, the mesoporous material has mesopores with a mode radius of greater than or equal to 1 nm and less than or equal to 25 nm and a pore volume of greater than or equal to 1.0 $cm^3/g$ and less than or equal to 3.0 $cm^3/g$ before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25. In addition, among the catalytic metal particles, a volume ratio of catalytic metal particles having a particle size of greater than or equal to 20 nm is less than or equal to 10%.

According to the above configuration, the catalyst layer included in the air electrode of the membrane-electrode assembly can utilize high proton conductivity of the ionomer. Furthermore, this catalyst layer can suppress a decrease in activity due to contact between a catalytic metal particle and the ionomer. Accordingly, the membrane-electrode assembly can achieve high catalytic activity.

Therefore, when, for example, a fuel cell is produced by using this membrane-electrode assembly, the fuel cell can achieve high power generation performance.

An electrochemical device according to a tenth aspect of the present disclosure includes a membrane-electrode assembly that includes a polymer electrolyte membrane, a fuel electrode disposed on a first main surface of the polymer electrolyte membrane, and an air electrode disposed on a second main surface of the polymer electrolyte membrane. The air electrode includes a catalyst layer that includes an ionomer and a catalyst including a mesoporous material and catalytic metal particles supported at least within the mesoporous material and containing platinum and a metal different from platinum. In the catalyst, the mesoporous material has mesopores with a mode radius of greater than or equal to 1 nm and less than or equal to 25 nm and a pore volume of greater than or equal to 1.0 $cm^3/g$ and less than or equal to 3.0 $cm^3/g$ before supporting of the catalytic metal particles, and has an average particle size of greater than or equal to 200 nm. A molar ratio of the metal different from platinum and contained in the catalytic metal particles relative to all metals contained in the catalytic metal particles is greater than or equal to 0.25. In addition, among the catalytic metal particles, a volume ratio of catalytic metal particles having a particle size of greater than or equal to 20 nm is less than or equal to 10%.

According to the above configuration, the catalyst layer included in the air electrode of the membrane-electrode assembly can utilize high proton conductivity of the ionomer. Furthermore, this catalyst layer can suppress a decrease in activity due to contact between a catalytic metal particle and the ionomer. Accordingly, the electrochemical device including this membrane-electrode assembly can achieve high catalytic activity.

Therefore, for example, when the electrochemical device according to the tenth aspect of the present disclosure is a fuel cell, the fuel cell can achieve high power generation performance.

A method for producing a catalyst according to an eleventh aspect of the present disclosure includes supporting the platinum within mesopores of a mesoporous material having an average particle size of greater than or equal to 200 nm, the mesopores having a mode radius of greater than or equal to 1 nm and less than or equal to 25 nm and a pore volume of greater than or equal to 1.0 $cm^3/g$ and less than or equal to 3.0 $cm^3/g$; subjecting the mesoporous material supporting platinum within the mesopores to water vapor adsorption treatment; and supporting a metal different from platinum within the mesopores of the mesoporous material that has been subjected to the water vapor adsorption treatment.

In the case where platinum is supported within mesopores of the mesoporous material having an average particle size of greater than or equal to 200 nm, and alloying is then performed by using a precursor solution of a metal different from platinum, the precursor solution does not permeate into the inside of the mesopores, and catalytic metal particles having a high content of the metal different from platinum and having a particle size of greater than or equal to 20 nm are generated in a large amount near the surface of the mesoporous material.

In contrast to this, in the method for producing a catalyst according to the eleventh aspect, the mesoporous material supporting platinum is subjected to water vapor adsorption treatment and then impregnated with a precursor solution of a metal different from platinum to thereby support the metal different from platinum. Therefore, the precursor solution of the metal different from platinum easily permeates into the inside of the mesoporous material, which can suppress the generation of catalytic metal particles having a particle size of greater than or equal to 20 nm near the surface of the mesoporous material.

Accordingly, the method for producing a catalyst according to the eleventh aspect can achieve high catalytic activity.

According to a method for producing a catalyst according to a twelfth aspect of the present disclosure, in the eleventh aspect, the water vapor adsorption treatment may include exposing the mesoporous material supporting platinum within the mesopores to an environment at a higher humidity than a relative humidity of outside air.

According to the above method, water vapor can be adsorbed on the mesoporous material by exposing the mesoporous material to an environment at a higher humidity than a relative humidity of outside air. Therefore, the water vapor adsorbed on the mesoporous material enables the precursor solution of the metal different from platinum to easily permeate into the inside of the mesoporous material.

According to a method for producing a catalyst according to a thirteenth aspect of the present disclosure, in the eleventh aspect, the mesoporous material that has been subjected to the water vapor adsorption treatment may be impregnated with a precursor solution of the metal different from platinum to prepare a suspension, and the suspension may be subjected to reduction treatment to support the metal different from platinum within the mesopores.

According to a method for producing a catalyst according to a fourteenth aspect of the present disclosure, in the thirteenth aspect, a solvent of the precursor solution of the metal different from platinum may be water.

The above method enables the precursor solution of the metal different from platinum to easily permeate into the inside of the mesoporous material.

According to a method for producing a catalyst according to a fifteenth aspect of the present disclosure, in the thirteenth aspect, the precursor solution of the metal different from platinum may be adjusted such that a molar ratio of the metal different from platinum relative to all metals contained in the suspension becomes greater than or equal to 0.38.

According to the above method, the molar ratio of the metal different from platinum in the catalytic metal particles can be greater than or equal to 0.38, and high catalytic activity can be obtained.

According to a method for producing a catalyst according to a sixteenth aspect of the present disclosure, in the thirteenth aspect, in the reduction treatment, at least one reducing agent selected from the group consisting of hydrazine and sodium borohydride may be used.

The above method enables the reducing agent to easily permeate into the inside of the mesoporous material.

According to a method for producing a catalyst according to a seventeenth aspect of the present disclosure, in the thirteenth aspect, the method may include heat treatment of the mesoporous material in which the metal different from platinum is supported within the mesopores by the reduction treatment.

According to a method for producing a catalyst according to an eighteenth aspect of the present disclosure, in the seventeenth aspect, the heat treatment may include heating the mesoporous material at a temperature higher than or equal to 700° C.

The above method promotes alloying of platinum and the metal different from platinum and enables the production of a catalyst having good catalytic activity and durability.

According to a method for producing a catalyst according to a nineteenth aspect of the present disclosure, in the thirteenth aspect, the metal different from platinum may be cobalt.

According to the above method, since the metal different from platinum is cobalt, the method can produce catalytic metal particles made of an alloy that contains platinum and cobalt and having good catalytic activity and durability.

According to a method for producing a catalyst according to a twentieth aspect of the present disclosure, in any one of the eleventh to nineteenth aspects, the mesoporous material may be mesoporous carbon.

According to the above method, since the mesoporous material is mesoporous carbon, a catalyst having good electrical conductivity and water repellency can be produced.

Embodiments of the present disclosure will be described below with reference to the attached drawings. Throughout the drawings, the same or corresponding components are denoted by the same reference numerals, and a description thereof may be omitted.

Embodiments

An electrochemical device according to an embodiment of the present disclosure will be described. A fuel cell will be described below as an example of the electrochemical device according to an embodiment of the present disclosure. However, the electrochemical device is not limited to the fuel cell and may be, for example, a water electrolysis device that electrolyzes water to produce hydrogen and oxygen.

Membrane-Electrode Assembly

First, the structure of a membrane-electrode assembly 10 included in an electrochemical device according to the present disclosure will be described with reference to FIG. 1. FIG. 1 is a schematic view illustrating an example of a schematic structure of the membrane-electrode assembly 10 included in an electrochemical device according to an embodiment of the present disclosure. As illustrated in FIG. 1, the membrane-electrode assembly 10 includes a polymer electrolyte membrane 11, and a fuel electrode (anode) and an air electrode (cathode) each including a catalyst layer 12 and a gas diffusion layer 13. The membrane-electrode assembly 10 is configured so that the polymer electrolyte membrane 11 is sandwiched between the fuel electrode and the air electrode on two sides thereof. That is, as illustrated in FIG. 1, the membrane-electrode assembly 10 is configured so that a pair of catalyst layers 12 is formed on both sides of the polymer electrolyte membrane 11, and a pair of gas diffusion layers 13 is disposed so as to sandwich the pair of catalyst layers 12.

Polymer Electrolyte Membrane

The polymer electrolyte membrane 11 provides ion (proton) conduction between the air electrode and the fuel electrode and needs to have both proton conductivity and gas barrier properties. The polymer electrolyte membrane 11 is, for example, an ion-exchange fluororesin membrane or an ion-exchange hydrocarbon resin membrane. In particular, perfluorosulfonic acid resin membranes are suitable because such perfluorosulfonic acid resin membranes have high proton conductivity and are stably present in, for example, a power generation environment of fuel cells. It is appropriate that the ion-exchange resin have an ion-exchange capacity of greater than or equal to 0.9 and less than or equal to 2.0 milliequivalents per gram of dry resin. An ion-exchange capacity of greater than or equal to 0.9 milliequivalents per gram of dry resin is suitable because high proton conductivity is easily obtained. An ion-exchange capacity of less than or equal to 2.0 milliequivalents per gram of dry resin is suitable because swelling of the resin with water is suppressed, and a dimensional change in the polymer electrolyte membrane 11 is reduced. It is appropriate that the polymer electrolyte membrane 11 have a thickness of greater than or equal to 5 µm and less than or equal to 50 µm. When the thickness is greater than or equal to 5 µm, high gas barrier properties are obtained. When the thickness is less than or equal to 50 µm, high proton conductivity is obtained.

Gas Diffusion Layer

The gas diffusion layers 13 have a current collecting function, gas permeability, and water repellency and, as illustrated in FIG. 1, may be configured to include two layers, i.e., a substrate 13a and a coating layer 13b. The substrate 13a is composed of a material having good electrical conductivity and gas- and liquid-permeability. Examples of the material include porous materials such as carbon paper, carbon fiber cloth, and carbon fiber felt. The coating layer 13b is a layer that is disposed between the substrate 13a and the catalyst layer 12, that reduces the contact resistance between the substrate 13a and the catalyst layer 12, and that improves liquid permeability (drainage performance). The coating layer 13b is formed by, for example, using, as main components, an electrically conductive material, such as carbon black, and a water-repellent resin, such as polytetrafluoroethylene (PTFE).

Catalyst Layer

Figure 2:
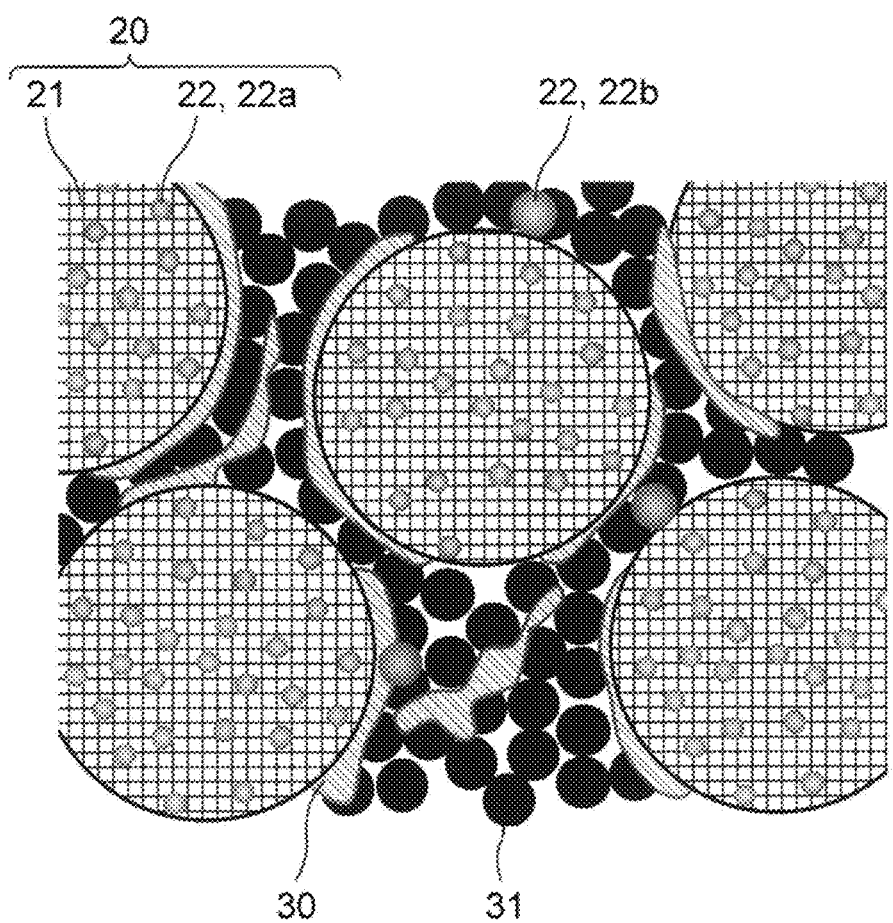
FIG. 2 is a schematic view illustrating a schematic structure of a catalyst layer included in the membrane-electrode assembly illustrated in FIG. 1.

The catalyst layers 12 are each a layer that increases the rate of the electrochemical reaction of an electrode. The catalyst layer 12 according to an embodiment of the present disclosure will be described with reference to FIG. 2. FIG. 2 is a schematic view illustrating a schematic structure of the catalyst layer 12 included in the membrane-electrode assembly 10 illustrated in FIG. 1.

As illustrated in FIG. 2, the catalyst layer 12 according to an embodiment of the present disclosure includes a catalyst 20 and an ionomer 30 (proton conductive resin). The catalyst 20 includes a mesoporous material 21 and catalytic metal particles 22 supported at least within the mesoporous material 21 and containing platinum and a metal different from platinum. In the present specification, among the catalytic metal particles 22, catalytic metal particles having a particle size of less than 20 nm and supported in mesopores may be referred to as first catalytic metal particles 22a, and catalytic metal particles having a particle size of greater than or equal to 20 nm due to aggregation may be referred to as second catalytic metal particles 22b so as to distinguish the catalytic metal particles 22 from each other.

Furthermore, to enhance drainage performance, a water-repellent material 31 may be added to the catalyst layer 12 according to an embodiment of the present disclosure. For example, the catalyst layer 12 may include at least one of carbon black or carbon nanotube as the water-repellent material 31. The carbon black may be Ketjenblack.

The method for forming the catalyst layer 12 according to an embodiment of the present disclosure may be, for example, a method that is typically used for fuel cells. For example, the above materials are dispersed in a solvent containing water or an alcohol, and the resulting dispersion is applied to a substrate such as the polymer electrolyte membrane 11, the gas diffusion layer 13, or a transfer film and dried to form the catalyst layer 12.

The catalyst layer 12 having the above structure can be used as a catalyst layer of the air electrode (cathode). Alternatively, the catalyst layer 12 may be used as a catalyst layer of the fuel electrode (anode). Alternatively, the catalyst layer of the fuel electrode may have a structure similar to that of an existing catalyst layer that is typically used in a membrane-electrode assembly of a fuel cell. In the membrane-electrode assembly 10 according to an embodiment of the present disclosure, it is appropriate to use the catalyst layer 12 having the above structure as at least the catalyst layer of the air electrode.

In the membrane-electrode assembly 10 according to an embodiment of the present disclosure, when the catalyst layer of the fuel electrode has a structure similar to that of an existing catalyst layer, the catalyst layer can be formed as follows. For example, a platinum or platinum alloy catalyst supported on carbon black and an ionomer are dispersed in a solvent containing water or an alcohol, and the resulting dispersion is applied to a substrate such as the polymer electrolyte membrane 11, the gas diffusion layer 13, or a transfer film and dried to form the catalyst layer.

Mesoporous Material

Mesoporous carbon will be described below as an example of the mesoporous material 21 included in the catalyst 20 according to an embodiment of the present disclosure. However, the mesoporous material 21 is not limited to the mesoporous carbon. Other materials may be used as long as the materials have the same mode radius and the same pore volume. Examples of the mesoporous material 21 other than mesoporous carbon include mesoporous materials constituted by an oxide of titanium, tin, niobium, tantalum, zirconium, aluminum, silicon, or the like.

It is appropriate that the mesoporous material 21 according to an embodiment of the present disclosure have mesopores with a mode radius of greater than or equal to 1 nm and less than or equal to 25 nm and a pore volume of greater than or equal to 1.0 cm$^3$/g and less than or equal to 3.0 cm$^3$/g before supporting of the catalytic metal particles 22. The pore volume of the mesopores is preferably greater than or equal to 1.0 cm$^3$/g because a large number of catalytic metal particles 22 can be supported within the mesoporous material 21. It is appropriate that the pore volume of the mesopores be less than or equal to 3.0 cm$^3$/g because the mesoporous material 21 serving as a structure has increased strength.

Furthermore, in the mesoporous material 21 according to an embodiment of the present disclosure, it is appropriate that the mesopores have a mode radius of greater than or equal to 3 nm and less than or equal to 6 nm, in particular, greater than or equal to 3 nm and less than or equal to 4 nm. The mode radius of the mesopores is preferably greater than or equal to 3 nm because a reaction gas is easily supplied into the pores. When the mode radius is less than or equal to 6 nm, the ionomer 30 is unlikely to enter the pores.

Furthermore, it is appropriate that the mesoporous material 21 according to an embodiment of the present disclosure have an average particle size of greater than or equal to 200 nm. When the average particle size is greater than or equal to 200 nm, the proportion of the catalytic metal particles 22 suffering poisoning by the ionomer 30 decreases, and catalytic activity can be improved. The mesoporous material 21 may have an average particle size of less than or equal to 1,000 nm. When the average particle size is less than or equal to 1,000 nm, a reaction gas is easily supplied to the catalytic metal particles 22 (first catalytic metal particles 22a) supported within the mesoporous material 21.

The average particle size of the mesoporous material 21 may be measured with, for example, a laser diffraction particle size distribution analyzer in a state where the mesoporous material 21 is dispersed in a solvent or may be observed with a scanning electron microscope (SEM) or a transmission electron microscope (TEM). In the case where the mesoporous material 21 is dispersed in a solvent, and the particle size distribution is measured, it is necessary that particles of the mesoporous material 21 do not aggregate. Therefore, water, an alcohol, or a mixed solvent of water and an alcohol can be suitably used as the solvent. It is appropriate to add a dispersant to the solvent to further enhance dispersibility. Examples of the dispersant include perfluorosulfonic acid resins, poly(oxyethylene) octylphenyl ether, and polyoxyethylene sorbitan monolaurate. To further enhance dispersibility, it is appropriate to perform dispersion treatment after the solvent and the mesoporous material are mixed. Examples of a dispersion treatment apparatus include ultrasonic homogenizers, wet jet mills, ball mills, and mechanical stirrers.

A method for producing the mesoporous material 21 according to an embodiment of the present disclosure is not particularly limited. For example, the method described in Japanese Unexamined Patent Application Publication No. 2010-208887 can be appropriately used.

The mesoporous material 21 produced by such a method has a structure in which mesopores with a large pore volume communicate with each other. Accordingly, the mesoporous material 21 easily support the catalytic metal particles 22 within the pores thereof, and a reaction gas is easily supplied to the supported catalytic metal particles 22. To adjust the average particle size of the mesoporous material 21, the mesoporous material 21 may be subjected to pulverization treatment after synthesis. Examples of the pulverization method include method with a wet bead mill, a dry bead mill, a wet ball mill, a dry ball mill, a wet jet mill, or a dry jet mill. In particular, a wet bead mill is suitably used because a fine particle size is easily achieved by pulverization.

Catalytic Metal Particles

The catalytic metal particles 22 supported at least within the mesoporous material 21 according to an embodiment of the present disclosure contain platinum and a metal different from platinum. Examples of the metal different from platinum include cobalt, nickel, manganese, titanium, aluminum, chromium, iron, molybdenum, tungsten, ruthenium, palladium, rhodium, iridium, osmium, copper, and silver. In particular, alloys of platinum and cobalt are suitable because they have high catalytic activity for oxygen reduction reactions and good durability in a power generation environment of fuel cells.

In the catalytic metal particles 22 according to an embodiment of the present disclosure, a molar ratio of the metal different from platinum and contained in the catalytic metal particles 22 relative to all metals contained in the catalytic metal particles 22 is greater than or equal to 0.25. As specifically described in Examples described later, such catalytic metal particles 22 exhibit high catalytic activity. The molar ratio of the metal different from platinum and contained in the catalytic metal particles 22 relative to all metal components contained in the catalytic metal particles 22 may be less than or equal to 0.5. This metal different from platinum is likely to be eluted in, for example, a power generation environment of a fuel cell, which may result in a decrease in power generation performance of the fuel cell in the case where power generation is performed for a long time. Accordingly, when the molar ratio of the metal different from platinum and contained in the catalytic metal particles 22 relative to all metal components contained in the catalytic metal particles 22 is less than or equal to 0.5, such a decrease in power generation performance can be suppressed. For example, when cobalt is used as the metal different from platinum, an alloy represented by a composition of $Pt_xCo$ (where x is greater than or equal to 1 and less than or equal to 3) can be used. It should be noted that individual catalytic metal particles 22 supported in the mesoporous material 21 are not satisfy the above range of the molar ratio, but the above range of the molar ratio is satisfied, as a whole, by all the catalytic metal particles 22 supported in the mesoporous material 21.

In the catalyst 20 according to an embodiment of the present disclosure, among the catalytic metal particles 22, a volume ratio of second catalytic metal particles 22b having a particle size of greater than or equal to 20 nm is less than or equal to 10%.

In the case where alloying is performed, for a mesoporous material 21 that supports platinum, by using a precursor solution of a metal different from platinum, this precursor solution does not permeate into the inside of the mesoporous material 21, and second catalytic metal particles 22b having a high content of the metal different from platinum and having a particle size of greater than or equal to 20 nm may be generated in a large amount near the surface of the mesoporous material 21. Such second catalytic metal particles 22b not only have a small reaction area but also have a composition significantly different from that of the first catalytic metal particles 22a, resulting in a decrease in the catalytic activity and durability. Accordingly, when the volume ratio of the second catalytic metal particles 22b is less than or equal to 10% among the catalytic metal particles 22, such a decrease in the catalytic activity and durability can be suppressed.

The first catalytic metal particles 22a may have a particle size of greater than or equal to 2 nm. When the first catalytic metal particles 22a have a particle size of greater than or equal to 2 nm, the particles have improved stability, and, for example, the metal is unlikely to dissolve in a power generation environment of fuel cells.

The volume ratio of the second catalytic metal particles 22b having a particle size of greater than or equal to 20 nm can be calculated by the following procedure. First, a section of the catalyst layer 12 according to an embodiment of the present disclosure is prepared with a broad ion beam (BIB), a focused ion beam (FIB), or the like and an image of the section is then captured with a scanning electron microscope (SEM) or a transmission electron microscope (TEM). Next, the resulting image is subjected to processing such as binarization to extract catalytic metal particles 22. Subsequently, for each of the catalytic metal particles 22, an area S in the image is calculated. A particle size r is calculated from the area S by using a formula of particle size $r=2*\sqrt{S/3.14}$, and a two-dimensional distribution of the catalytic metal particles 22 (second catalytic metal particles 22b) having a particle size r of greater than or equal to 20 nm is determined.

Furthermore, on the assumption that the second catalytic metal particles 22b have a spherical shape and are isotropically distributed in the depth direction of the catalyst layer 12, a three-dimensional distribution of the second catalytic metal particles 22b having a particle size r of greater than or equal to 20 nm is determined in the catalyst layer 12. The volume of the second catalytic metal particles 22b included in the catalyst layer 12 having a certain volume is calculated from this three-dimensional distribution and is compared with the volume of all the catalytic metal particles 22 calculated from the charged amount. Thus, the volume ratio of the second catalytic metal particles 22b can be determined.

It is appropriate that a weight ratio of the catalytic metal particles 22 (first catalytic metal particles 22a and second catalytic metal particles 22b) relative to the total weight of the mesoporous material 21 supporting the catalytic metal particles 22 be greater than or equal to 0.1 and less than or equal to 1.5. If the weight of the catalytic metal particles 22 per unit weight of the mesoporous material 21 is increased, and the weight ratio of the catalytic metal particles 22 is increased and exceeds the range of this weight ratio, the catalytic metal particles 22 aggregate. Conversely, if the weight of the catalytic metal particles 22 per unit weight of the mesoporous material 21 is decreased, and the weight ratio of the catalytic metal particles 22 is decreased and is below the range of this weight ratio, the amount of mesoporous carbon needs to be increased in order to ensure the amount of catalytic metal particles 22 required. As a result, the thickness of the catalyst layer 12 is increased.

Method for Producing Catalyst

A method for producing the catalyst 20 will be described. First, a mesoporous material 21 is prepared by the method described above. A platinum precursor is added dropwise to the prepared mesoporous material. The resulting mesoporous material is dried and subjected to heat treatment in a reducing atmosphere, to thereby support platinum in the mesoporous material 21. For example, a diamminedinitroplatinum nitric acid solution or a chloroplatinic acid solution can be used as the platinum precursor. The temperature and the time in the heat treatment are appropriately set. The temperature and the time may be, for example, 220° C. and two hours, respectively.

Next, the mesoporous material 21 supporting platinum is subjected to water vapor adsorption treatment. This water vapor adsorption treatment can be performed by exposing the mesoporous material 21 supporting platinum at room temperature (for example, 30° C.) to an environment at a higher humidity than the relative humidity of the outside air for a predetermined time. The environment is, for example, an environment at a relative humidity of greater than or equal to 80%. It is appropriate that the predetermined time during which the mesoporous material 21 supporting platinum is exposed to this high-humidity environment be, for example, greater than or equal to 1 hour and less than or equal to 48 hours.

After water vapor is adsorbed as described above on the mesoporous material 21 supporting platinum, the mesoporous material 21 is impregnated with a precursor solution of a metal different from platinum to prepare a suspension. The precursor solution of the metal different from platinum may be adjusted such that the molar ratio of the metal different from platinum relative to all metals contained in the suspension becomes greater than or equal to 0.38.

After the suspension is prepared as described above, reduction treatment of the suspension is conducted with a reducing agent. The metal different from platinum can be supported in mesopores by conducting the reduction treatment. The mesoporous material 21 that has been subjected to the reduction treatment is further subjected to heat treatment in a reducing atmosphere by heating at a predetermined temperature for a predetermined time to perform alloying of platinum with the metal different from platinum.

When, for example, cobalt is used as the metal different from platinum, the precursor solution of the metal different from platinum with which the mesoporous material 21 supporting platinum is impregnated may contain, for example, cobalt chloride or cobalt nitrate. An appropriate solvent of the precursor solution of the metal different from platinum is water.

The reducing agent for reducing the metal different from platinum is, for example, at least one of hydrazine or sodium borohydride. When the mesoporous material 21 that has been subjected to the reduction treatment is subjected to the heat treatment for alloying, it is appropriate that the predetermined temperature be higher than or equal to 700° C. This heat treatment may be performed at 1,100° C. for 120 minutes, for example.

As described above, the metal different from platinum is likely to be eluted in, for example, a power generation environment of a fuel cell, which may result in a decrease in power generation performance of the fuel cell in the case where power generation is performed for a long time. Therefore, the excess metal different from platinum is dissolved in advance such that the molar ratio of the metal different from platinum and contained in the catalytic metal particles 22 relative to all metal components contained in the catalytic metal particles 22 becomes less than or equal to 0.5. Specifically, after alloying of platinum and the metal different from platinum is performed, the excess metal different from platinum is dissolved to prepare the catalyst 20 formed of the mesoporous material 21 supporting an alloy of platinum and the metal different from platinum.

Water-Repellent Material

In general, a catalyst layer including carbon particles having an average particle size of greater than or equal to 10 nm and less than or equal to 100 nm achieves a high drainage performance due to capillary force. However, since the mesoporous material 21 used in the catalyst layer 12 according to an embodiment of the present disclosure has an average particle size of greater than or equal to 200 nm, a problem may be caused in the drainage performance. In view of this, at least one of carbon black or carbon nanotube may be added as a water-repellent material to the catalyst layer 12. This structure can enhance the drainage performance of the catalyst layer 12. Therefore, when the membrane-electrode assembly 10 according to an embodiment of the present disclosure is used in a fuel cell, the power generation performance of the fuel cell can be enhanced.

Examples of the carbon black include Ketjenblack, acetylene black, Vulcan, and Black Pearls. Examples of the carbon nanotube include single-walled carbon nanotubes and multi-walled carbon nanotubes. In particular, Ketjenblack, in which aggregates grow linearly, is suitable because effective drainage paths can be formed in the catalyst layer 12 even by addition of a small amount of Ketjenblack.

Ionomer

The ionomer 30 (proton conductive resin) according to an embodiment of the present disclosure may be an ion-exchange resin. In particular, perfluorosulfonic acid resins are suitable because such perfluorosulfonic acid resins have high proton conductivity and are stably present in a power generation environment of fuel cells. The ion-exchange resin may have an ion-exchange capacity of greater than or equal to 0.9 and less than or equal to 2.0 milliequivalents per gram of dry resin.

When the ion-exchange capacity is greater than or equal to 0.9 milliequivalents per gram of dry resin, high proton conductivity is easily obtained. When the ion-exchange capacity is less than or equal to 2.0 milliequivalents per gram of dry resin, swelling of the resin with water is suppressed, and gas diffusibility in the catalyst layer 12 is unlikely to decrease. It is appropriate that the weight ratio of the ionomer 30 relative to the total weight of the mesoporous material 21 and the water-repellent material 31 that are included in the catalyst layer 12 be greater than or equal to 0.2 and less than or equal to 2.0.

EXAMPLES

Examples 1 and 2 and Comparative Examples 1 and 2 according to the present disclosure and Conventional Example will be described below. Examples 1 and 2 differ from Comparative Examples 1 and 2 and Conventional Example in that water vapor adsorption treatment is performed in Examples 1 and 2, whereas this water vapor adsorption treatment is not performed in Comparative Examples 1 and 2 and Conventional Example. Conventional Example differs from Examples 1 and 2 and Comparative Examples 1 and 2 in that Ketjenblack is used in Conventional Example, whereas mesoporous carbon is used in Examples 1 and 2 and Comparative Examples 1 and 2. Example 1 and Example 2 differ in terms of the amount of cobalt charged. The amount of cobalt charged in Example 1 is larger than that in Example 2. Comparative Example 1 and Comparative Example 2 also differ in terms of the amount of cobalt charged. The amount of cobalt charged in Comparative Example 1 is larger than that in Comparative Example 2.

First, methods for synthesizing catalysts included in Examples 1 and 2, Comparative Examples 1 and 2, and Conventional Example will be described.

Synthesis of Catalyst

Example 1

A commercially available mesoporous carbon (CNovel, manufactured by Toyo Tanso Co., Ltd.) having a designed pore size of 10 nm was added to a mixed solvent containing water and ethanol in equal proportions to prepare a slurry with a solid content of 1% by weight. Zirconia beads with a diameter of 0.5 mm were added to the slurry, and the slurry was ground in a media agitation wet bead mill (LABSTAR mini, manufactured by Ashizawa Finetech Ltd.) at a peripheral speed of 12 m/s for 20 minutes. The zirconia beads were removed from the ground slurry, and the solvent was evaporated. The resulting aggregate was then ground in a mortar to produce a carbon support (mesoporous material 21) used in Example 1.

To 400 mL of a mixed solvent containing water and ethanol at a ratio of 1:1 (weight ratio), 1 g of the carbon support obtained above was added, and the mixture was subjected to ultrasonic dispersion for 15 minutes. After the dispersion, a 14 wt % diamminedinitroplatinum nitric acid solution was added dropwise under stirring in a nitrogen atmosphere such that the weight ratio of platinum to the carbon support became 50% by weight. The resulting mixture was stirred at 80° C. for six hours. After the mixture was left to cool, the mixture was filtered, washed, and dried at 80° C. for 15 hours. The resulting aggregates were ground in a mortar and subjected to heat treatment at 220° C. for two hours in an atmosphere containing nitrogen and hydrogen at a ratio of 85:15 to produce platinum-supported mesoporous carbon (hereinafter, referred to as Pt/MPC).

In a beaker, 0.3 g of the Pt/MPC was placed and allowed to stand at 30° C. and 90% RH (relative humidity) for 12 hours. Thus, water vapor was adsorbed on the Pt/MPC (water vapor adsorption treatment step).

Furthermore, to the beaker containing the Pt/MPC therein, 30 mL of pure water in which cobalt chloride hexahydrate was dissolved in such an amount that the molar ratio of cobalt to the total amount of platinum and cobalt became 0.48 was added. The resulting mixture was subjected to ultrasonic dispersion for 15 minutes, and 30 mL of a 1 wt % aqueous solution of sodium borohydride was then slowly added dropwise thereto. The mixture was stirred at room temperature for 10 minutes to reduce cobalt. The resulting mixture was filtered, washed, and dried at 80° C. for 15 hours. The resulting powder was ground in a mortar and subjected to heat treatment at 1,100° C. for 120 minutes in an atmosphere containing nitrogen and hydrogen at a ratio of 97:3 to form an alloy. Furthermore, the resulting powder was added to 100 mL of a 0.2 mol/L sulfuric acid aqueous solution. The mixture was stirred at 80° C. for two hours, filtered, and washed. Subsequently, the resulting powder was added to 100 ml of a 0.2 mol/L nitric acid aqueous solution, and the mixture was stirred at 70° C. for two hours to dissolve an excess cobalt component in advance. The mixture was filtered, washed, and dried at 80° C. for 15 hours. The resulting powder was ground in a mortar to produce, as a catalyst of Example 1, platinum-cobalt alloy-supported mesoporous carbon (hereinafter, referred to as PtCo/MPC).

Example 2

A catalyst (PtCo/MPC) of Example 2 was produced as in the catalyst of Example 1 except for the amount of cobalt chloride hexahydrate and the heat treatment conditions for alloying.

Specifically, the amount of cobalt chloride hexahydrate, which was added to the beaker containing the Pt/MPC after water vapor was adsorbed on the Pt/MPC, was adjusted such that the molar ratio of cobalt to the total amount of platinum and cobalt became 0.38. The heat treatment for alloying was performed at 1,000° C. for 30 minutes.

Comparative Example 1

A catalyst (PtCo/MPC) of Comparative Example 1 was produced by the same method as that in Example 2 except that the water vapor adsorption treatment step of adsorbing water vapor on the Pt/MPC was omitted.

Comparative Example 2

A catalyst (PtCo/MPC) of Comparative Example 2 was produced as in the catalyst of Comparative Example 1 except for the amount of cobalt chloride hexahydrate and the heat treatment conditions for alloying.

Specifically, the amount of cobalt chloride hexahydrate, which was added to the beaker containing the Pt/MPC after water vapor was adsorbed on the Pt/MPC, was adjusted such that the molar ratio of cobalt to the total amount of platinum and cobalt became 0.28. The heat treatment for alloying was performed at 900° C. for 30 minutes.

Conventional Example

A catalyst (PtCo/KB) of Conventional Example was produced by the same method as that in Comparative Example 2 except that Ketjenblack (EC300J, manufactured by Lion Specialty Chemicals, Co., Ltd.) was used as the carbon support.

Calculation of Catalyst Supporting Ratio and Cobalt Molar Ratio

The catalyst supporting ratio and cobalt molar ratio of each of the catalysts of Examples 1 and 2, the catalysts of Comparative Examples 1 and 2, and the catalyst of Conventional Example were determined as follows. First, the catalyst was weighed in a beaker made of quartz and heated in an electric furnace to combust carbon. After the beaker was left to cool, small amounts of nitric acid and hydrochloric acid were added to the beaker, and the resulting sample was heated and diluted with pure water. Subsequently, the sample was introduced in an inductively coupled plasma atomic emission spectrometer (CIROS-120, manufactured by Spectro) and subjected to quantitative analysis of platinum and cobalt.

Thus, the weights of platinum and cobalt in the catalyst were determined. Furthermore, the catalyst supporting ratio was calculated from the ratio of the weight of platinum and cobalt to the total weight of the catalyst.

Calculation of Volume Ratio of Second Catalytic Metal Particle

The volume ratios of the second catalytic metal particles $22b$ of the catalysts of Examples 1 and 2, the catalysts of Comparative Examples 1 and 2, and the catalyst of Conventional Example were determined as follows. A section of a catalyst layer 12 prepared by the method described below was prepared with a BIB, and an image of the section was then captured with a scanning electron microscope (S-5500, manufactured by Hitachi High-Tech Corporation). Next, catalytic metal particles 22 (second catalytic metal particles $22b$) having a particle size of greater than or equal to 20 nm were extracted from the image, and a two-dimensional distribution of the second catalytic metal particles $22b$ in the catalyst layer 12 was determined. Furthermore, on the assumption that the second catalytic metal particles $22b$ have a spherical shape and are isotropically distributed in the depth direction of the catalyst layer 12, a three-dimensional distribution of the second catalytic metal particles $22b$ in the catalyst layer 12 was determined. The volume of the second catalytic metal particles $22b$ included in the catalyst layer 12 having a certain volume was calculated from the three-dimensional distribution and was compared with the volume of all the catalytic metal particles 22 calculated from the charged amount. Thus, the volume ratio of the second catalytic metal particles $22b$ was determined.

Evaluation of Fuel Cell Performance

To evaluate the performance of each of the catalysts of Examples 1 and 2, the catalysts of Comparative Examples 1 and 2, and the catalyst of Conventional Example, a single cell of a fuel cell including the catalyst layer 12 containing the catalyst was prepared as follows.

First, catalyst layers of air electrodes of Examples 1 and 2 and Comparative Examples 1 and 2 were each prepared by the procedure described below. The catalyst of Example 1, Example 2, Comparative Example 1, or Comparative Example 2 and Ketjenblack (EC300J, manufactured by Lion Specialty Chemicals, Co., Ltd.) having a weight that was half the weight of the mesoporous carbon included in the catalyst were added to a mixed solvent containing water and ethanol in equal proportions, and the mixture was stirred. To the resulting slurry, an ionomer (Nafion, manufactured by DuPont) was added such that the weight ratio of the ionomer to total carbon (mesoporous carbon+Ketjenblack) became 1.2 and dispersed. A catalyst ink prepared in this manner was applied to a polymer electrolyte membrane 11 (Nafion film, manufactured by DuPont) by a spray method to form a catalyst layer of the air electrode.

On the other hand, a catalyst layer of an air electrode of Conventional Example was prepared by the procedure described below. The catalyst of Conventional Examples was added to a mixed solvent containing water and ethanol in equal proportions, and the mixture was stirred. To the resulting slurry, an ionomer (Nafion, manufactured by DuPont) was added such that the weight ratio of the ionomer to the carbon support became 0.8 and dispersed. A catalyst ink prepared in this manner was applied to a polymer electrolyte membrane 11 (Nafion film, manufactured by DuPont) by a spray method to form a catalyst layer of the air electrode.

Subsequently, catalyst layers of fuel electrodes were formed by the procedure described below. The catalyst layers of the fuel electrodes in Examples 1 and 2, Comparative Examples 1 and 2, and Conventional Example were the same.

First, a commercially available platinum-supported carbon black catalyst (TEC10E50E, manufactured by Tanaka Kikinzoku Kogyo K.K.) was added to a mixed solvent containing water and ethanol in equal proportions, and the mixture was stirred. To the resulting slurry, an ionomer (Nafion, manufactured by DuPont) was added such that the weight ratio of the ionomer to the carbon support became 0.8, and the mixture was subjected to ultrasonic dispersion. A catalyst ink prepared in this manner was applied to a main surface of the polymer electrolyte membrane 11, the main surface being opposite to a main surface having the catalyst layer of the air electrode, by a spray method to form a catalyst layer of the fuel electrode.

A gas diffusion layer 13 (GDL25BC, manufactured by SGL Carbon Japan Co., Ltd.) was placed on the catalyst layer of the air electrode and the catalyst layer of the fuel electrode of each of Examples 1 and 2, Comparative Examples 1 and 2, and Conventional Example prepared as described above. A pressure of 7 kgf/cm$^2$ was applied thereto for five minutes at a high temperature of 140° C. to produce a membrane-electrode assembly 10.

The resulting membrane-electrode assembly was placed between separators each having a serpentine flow path. The resulting assembly was installed in a predetermined jig to produce a single cell of a fuel cell.

While the temperature of the single cell of the fuel cell was maintained at 65° C., hydrogen with a dew point of 65° C. was allowed to flow to the fuel electrode side at a utilization ratio of 70%, and air with a dew point of 65° C. was allowed to flow to the air electrode side at an oxygen utilization ratio of 40%. An electronic load device (PLZ-664WA, manufactured by Kikusui Electronics Corporation) was connected to the single cell of the fuel cell, and a cell voltage generated when a load of 0.3 A/cm$^2$ was applied was measured.

Table 1 below summarizes the production methods, physical properties, and other properties of the catalysts of Examples 1 and 2, the catalysts of Comparative Examples 1 and 2, and the catalyst of Conventional Example produced as described above.

TABLE 1

| | Catalyst before alloying | Water vapor adsorption treatment | Molar ratio of cobalt charged | Heat treatment conditions for alloying | Catalyst supporting ratio | Cobalt molar ratio | Second catalytic metal particle volume ratio | Cell voltage |
|---|---|---|---|---|---|---|---|---|
| Example 1 | Pt/MPC | 30° C. 90% RH 12 h | 0.48 | 1,100° C. 120 min | 46.3 wt % | 0.37 | 8% | 0.780 |
| Example 2 | Pt/MPC | 30° C. 90% RH 12 h | 0.38 | 1,000° C. 30 min | 47.9 wt % | 0.26 | 10% | 0.775 |
| Comparative Example 1 | Pt/MPC | Not performed | 0.38 | 1,000° C. 30 min | 46.2 wt % | 0.29 | 29% | 0.769 |
| Comparative Example 2 | Pt/MPC | Not performed | 0.28 | 900° C. 30 min | 47.5 wt % | 0.19 | 8% | 0.757 |
| Conventional Example | Pt/KB | Not performed | 0.28 | 900° C. 30 min | 51.8 wt % | 0.27 | 10% | 0.759 |

Table 1 summarizes the production methods (production conditions), physical properties, and power generation performance of the catalysts of Examples 1 and 2, the catalysts of Comparative Examples 1 and 2, and the catalyst of Conventional Example. Specifically, Table 1 shows, in the horizontal axis direction, the production methods (production conditions) in terms of the type of catalyst before alloying, whether or not the water vapor adsorption treatment was performed and the treatment conditions, the amount of cobalt charged (molar ratio of cobalt charged), and treatment conditions for alloying. Furthermore, Table 1 shows, in the horizontal axis direction, the physical properties and power generation performance in terms of catalyst supporting ratio, the molar ratio (cobalt molar ratio) of cobalt contained in platinum-cobalt alloy particles supported on the carbon support, the volume ratio (second catalytic metal particle volume ratio) of platinum-cobalt alloy particles formed near the surface of the carbon support and having a particle size of greater than or equal to 20 nm due to aggregation, and the cell voltage.

First, the difference in volume ratio (second catalytic metal particle volume ratio) of platinum-cobalt alloy particles due to the difference in carbon support was examined by the comparison between Conventional Example and Comparative Example 2. As shown in Table 1, in Conventional Example, in which Ketjenblack was used as the carbon support, when the molar ratio of cobalt charged was 0.28 and the heat treatment for alloying was conducted under the conditions at a temperature of 900° C. for 30 minutes, the molar ratio of cobalt contained in the alloy was 0.27. In contrast, in Comparative Example 2, in which mesoporous carbon was used as the carbon support, the molar ratio of cobalt in the catalyst produced under the same conditions was as low as 0.19. This is probably because the cobalt precursor solution is unlikely to enter the mesoporous carbon, and platinum within the mesoporous carbon is not sufficiently alloyed. The voltages of the fuel cells in which these were used as catalysts of the air electrodes were substantially equal to each other.

When the catalyst including platinum-supported Ketjenblack (hereinafter, referred to as Pt/KB) obtained by supporting platinum on Ketjenblack serving as a carbon support is compared with the catalyst including Pt/MPC, the catalyst including Pt/MPC usually exhibits a higher performance. However, as shown in Table 1, the comparison between Comparative Example 2 and Conventional Example showed that the superiority of this performance was lost by conducting the cobalt alloying treatment in Comparative Example 2. This is probably due to the difference in catalytic activity of the resulting platinum-cobalt alloy particles. Specifically, it is considered that the platinum-cobalt alloy particles of Comparative Example 2 had a lower cobalt molar ratio than that in Conventional Example and thus had lower catalytic activity.

Furthermore, Comparative Example 1 will be discussed. In Comparative Example 1, the catalyst was produced by the production method similar to that in Comparative Example 2. However, the molar ratio of cobalt charged and the heat treatment conditions for alloying were changed. Specifically, in Comparative Example 1, the molar ratio of cobalt charged was 0.38, and the heat treatment for alloying was conducted under the conditions at a temperature of 1,000° C. for 30 minutes, thereby increasing the cobalt molar ratio to 0.29. In addition, as shown in Table 1, the single cell of the fuel cell in which Comparative Example 1 was used as the catalyst of the air electrode generated a higher cell voltage than the single cell of the fuel cell in which Conventional Example was used as the catalyst of the air electrode and the single cell of the fuel cell in which Comparative Example 2 was used as the catalyst of the air electrode.

Figure 3:
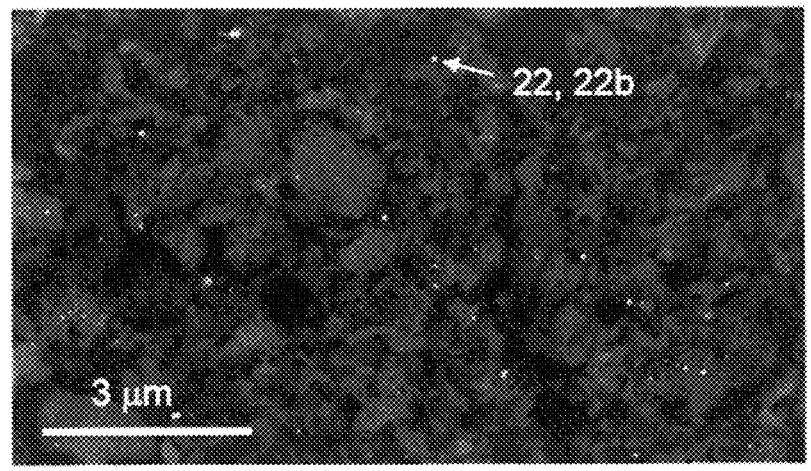
FIG. 3 is a view showing an example of a scanning electron microscope (SEM) image of a section of a catalyst layer according to Comparative Example 1 of the present disclosure.

However, as shown in FIG. 3, the SEM observation of a section of the catalyst layer formed by the catalyst of Comparative Example 1 showed that a large number of second catalytic metal particles 22b were present in the catalyst of Comparative Example 1. FIG. 3 is a view showing an example of a scanning electron microscope (SEM) image of the section of the catalyst layer 12 according to Comparative Example 1 of the present disclosure. In FIG. 3, the second catalytic metal particles 22b are shown as a plurality of white spots.

Figure 4:
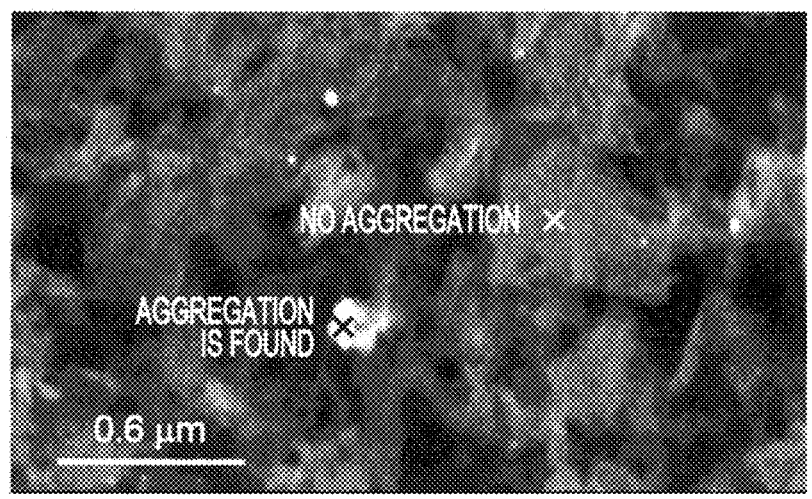
FIG. 4 is an enlarged view of a portion of the SEM image of the section of the catalyst layer shown in FIG. 3.

Furthermore, in the section shown in FIG. 3, elemental analysis was performed in a portion where the catalytic metal particles 22 aggregated and a portion where the catalytic metal particles 22 did not aggregate. Specifically, as shown in FIG. 4, the catalyst of Comparative Example 1 has both portions where the catalytic metal particles 22 aggregate to have a particle size of greater than or equal to 20 nm and portions where no aggregation is found (or portions where, even if the catalytic metal particles 22 aggregate, the particles have a particle size of less than 20 nm). FIG. 4 is an enlarged view of a portion of the SEM image of the section of the catalyst layer 12 shown in FIG. 3.

In view of the above, elemental analysis of the section shown in FIG. 3 was conducted with an energy-dispersive X-ray spectrometer (Apollo40, manufactured by AMETEK, Inc.). The results showed that the portion where catalytic metal particles 22 (second catalytic metal particles 22b) having a particle size of greater than or equal to 20 nm had a cobalt molar ratio of 0.46, whereas the portion where catalytic metal particles 22 (first catalytic metal particles 22a) having a particle size of less than 20 nm had a cobalt molar ratio of 0.19.

Accordingly, on the basis of the analysis results for Comparative Example 1, it is considered that the cobalt precursor solution that could not enter the mesoporous carbon remained on the surface of the mesoporous carbon in a large amount, and a large amount of cobalt component was precipitated, resulting in the generation of the second catalytic metal particles 22b. Such second catalytic metal particles 22b not only have a small reaction area but also have a composition significantly different from that of the first catalytic metal particles 22a, and thus the catalytic activity is decreased. Accordingly, comparing Comparative Example 1 and Conventional Example, although the molar ratios of cobalt contained in the platinum-cobalt alloy particles are substantially equal to each other, Comparative Example 1 has a larger number of the second catalytic metal particles 22b than Conventional Example and thus the platinum-cobalt alloy particles in Comparative Example 1 are considered to have lower catalytic activity.

Figure 5:
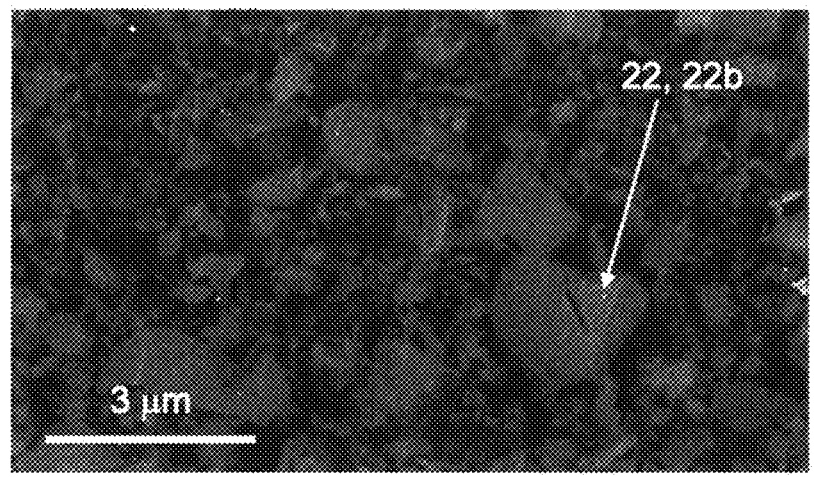
FIG. 5 is a view showing an example of a SEM image of a section of a catalyst layer according to Example 2 of the present disclosure.

Next, Example 2 will be discussed. In Example 2, the water vapor adsorption treatment was further conducted in the production method in Comparative Example 1. Specifically, in Example 2, Pt/MPC was subjected to the water vapor adsorption treatment at 30° C. and 90% RH for 12 hours and then subjected to the alloying treatment by the same method as that used in Comparative Example 1. According to the SEM observation of a section of the catalyst layer formed by the catalyst of Example 2, the number of the second catalytic metal particles 22b significantly reduced compared with Comparative Example 1, as shown in FIG. 5. The volume ratio of the second catalytic metal particles 22b in Example 2 was equal to that in Conventional Example, as shown in Table 1. FIG. 5 is a view showing an example of a SEM image of the section of the catalyst layer 12 according to Example 2 of the present disclosure. In FIG. 5, the second catalytic metal particles 22b are shown as a plurality of white spots.

This significant reduction in the number of the second catalytic metal particles 22b is probably caused because, in Example 2, the preliminary adsorption of water vapor on Pt/MPC enabled the cobalt precursor solution to easily enter the inside of the mesoporous carbon. In addition, the cobalt molar ratio was 0.26, which was substantially equal to that (cobalt molar ratio: 0.27) of Conventional Example. That is, it was found that Example 2 provided PtCo/MPC having platinum-cobalt alloy particles containing cobalt in a ratio substantially equal to that of Conventional Example. Furthermore, as shown in Table 1, the voltage of the single cell of the fuel cell in which the catalyst of Example 2 was used as the catalyst of the air electrode was significantly improved compared with that of the single cell of the fuel cell in which the catalyst of Conventional Example was used as the catalyst of the air electrode.

Furthermore, Example 1 will be discussed. In Example 1, the catalyst was produced by the same production method as that used in Example 2. However, the molar ratio of cobalt charged and the heat treatment conditions for alloying were changed. Specifically, in Example 1, the molar ratio of cobalt charged was 0.48, and the heat treatment for alloying was conducted under the conditions at a temperature of 1,100° C. for 120 minutes, thereby increasing the cobalt molar ratio to 0.37 while suppressing the generation of the second catalytic metal particles 22b. Consequently, as shown in Table 1, the single cell of the fuel cell in which the catalyst of Example 1 was used as the catalyst of the air electrode generated a higher cell voltage than the single cell of the fuel cell in which the catalyst of Example 2 was used as the catalyst of the air electrode. This is probably because the increase in the cobalt molar ratio improved the catalytic activity of the platinum-cobalt alloy particles.

Accordingly, it was found that when mesoporous carbon is used as the carbon support, the generation of the second catalytic metal particles 22b can be suppressed by performing the water vapor adsorption treatment. Furthermore, it was also found that when the amount of cobalt charged (molar ratio of cobalt charged) is greater than or equal to 0.38, the cobalt molar ratio in the catalyst can be increased to increase the cell voltage of a single cell of a fuel cell.

From the foregoing description, many modifications and other embodiments of the present disclosure will be apparent to those skilled in the art. Therefore, the foregoing description is to be construed as illustrative only and is provided to teach those skilled in the art the best mode for carrying out the present disclosure. Details of the structures and/or functions in the description can be substantially changed without departing from the spirit of the present disclosure.

The present disclosure is useful for a catalyst used in a membrane-electrode assembly that forms an electrochemical device such as a fuel cell.

What is claimed is:

1. A catalyst comprising:
    a mesoporous material comprising mesoporous particles; and
    catalytic metal particles supported at least within each of the mesoporous particles and containing platinum and a metal different from platinum,
    wherein the mesoporous material has mesopores with a mode radius of greater than or equal to 1 nm and less than or equal to 25 nm and a pore volume of greater than or equal to 1.0 $cm^3/g$ and less than or equal to 3.0 $cm^3/g$ before supporting of the catalytic metal particles, and the mesoporous particles have an average particle size of greater than or equal to 200 nm,
    a molar ratio of the metal different from platinum and contained in the catalytic metal particles relative to all metals contained in the catalytic metal particles is greater than or equal to 0.25, and among the catalytic metal particles, a volume ratio of catalytic metal particles having a particle size of greater than or equal to 20 nm is less than or equal to 10%.

2. The catalyst according to claim 1, wherein a molar ratio of the metal different from platinum and contained in the catalytic metal particles having a particle size of greater than or equal to 20 nm relative to all metals contained in the catalytic metal particles having a particle size of greater than or equal to 20 nm is larger than a molar ratio of the metal different from platinum and contained in catalytic metal particles having a particle size of less than 20 nm relative to all metals contained in the catalytic metal particles having a particle size of less than 20 nm.

3. The catalyst according to claim 1, wherein the metal different from platinum is cobalt.

4. The catalyst according to claim 1, wherein the mode radius of the mesopores is greater than or equal to 3 nm and less than or equal to 6 nm.

5. The catalyst according to claim 1, wherein the mesoporous material comprises mesoporous carbon.

6. A catalyst layer comprising the catalyst according to claim 1 and an ionomer.

7. The catalyst layer according to claim 6, further comprising at least one of carbon black or carbon nanotube.

8. The catalyst layer according to claim 6, further comprising Ketjenblack.

9. A membrane-electrode assembly comprising
a polymer electrolyte membrane;
a fuel electrode disposed on a first main surface of the polymer electrolyte membrane; and
an air electrode disposed on a second main surface of the polymer electrolyte membrane,
wherein the air electrode includes the catalyst layer according to claim 6.

10. An electrochemical device comprising the membrane-electrode assembly according to claim 9.

11. A method for producing a catalyst, comprising:
supporting platinum within mesopores of a mesoporous material having an average particle size of greater than or equal to 200 nm, the mesopores having a mode radius of greater than or equal to 1 nm and less than or equal to 25 nm and a pore volume of greater than or equal to 1.0 cm$^3$/g and less than or equal to 3.0 cm$^3$/g;
subjecting the mesoporous material supporting platinum within the mesopores to water vapor adsorption treatment; and
supporting a metal different from platinum within the mesopores of the mesoporous material that has been subjected to the water vapor adsorption treatment.

12. The method for producing a catalyst according to claim 11, wherein the water vapor adsorption treatment includes exposing the mesoporous material supporting platinum within the mesopores to an environment at a higher humidity than a relative humidity of outside air.

13. The method for producing a catalyst according to claim 11, wherein the mesoporous material that has been subjected to the water vapor adsorption treatment is impregnated with a precursor solution of the metal different from platinum to prepare a suspension, and the suspension is subjected to reduction treatment to support the metal different from platinum within the mesopores.

14. The method for producing a catalyst according to claim 13, wherein a solvent of the precursor solution of the metal different from platinum is water.

15. The method for producing a catalyst according to claim 13, wherein the precursor solution of the metal different from platinum is adjusted such that a molar ratio of the metal different from platinum relative to all metals contained in the suspension becomes greater than or equal to 0.38.

16. The method for producing a catalyst according to claim 13, wherein, in the reduction treatment, at least one reducing agent selected from the group consisting of hydrazine and sodium borohydride is used.

17. The method for producing a catalyst according to claim 13, comprising heat treatment of the mesoporous material in which the metal different from platinum is supported within the mesopores by the reduction treatment.

18. The method for producing a catalyst according to claim 17, wherein the heat treatment includes heating the mesoporous material at a temperature higher than or equal to 700° C.

19. The method for producing a catalyst according to claim 13, wherein the metal different from platinum is cobalt.

20. The method for producing a catalyst according to claim 11, wherein the mesoporous material comprises mesoporous carbon.

* * * * *